(12) United States Patent
Sorbara et al.

(10) Patent No.: US 8,775,849 B2
(45) Date of Patent: Jul. 8, 2014

(54) SYSTEMS AND METHODS FOR TRANSPORTING TIME-OF-DAY INFORMATION IN A COMMUNICATION SYSTEM

(75) Inventors: Massimo Sorbara, Freehold, NJ (US); Sigurd Schelstraete, Menlo Park, CA (US); Robert A. Day, Jackson, NJ (US); Peter D. Keller, Tinton Falls, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 353 days.

(21) Appl. No.: 13/103,072

(22) Filed: May 8, 2011

(65) Prior Publication Data

US 2011/0296226 A1    Dec. 1, 2011

Related U.S. Application Data

(60) Provisional application No. 61/332,851, filed on May 10, 2010, provisional application No. 61/371,572, filed on Aug. 6, 2010, provisional application No. 61/429,737, filed on Jan. 4, 2011, provisional application No. 61/429,855, filed on Jan. 5, 2011.

(51) Int. Cl.
    *G06F 1/12*     (2006.01)
    *G06F 15/16*    (2006.01)
    *H04L 7/06*     (2006.01)

(52) U.S. Cl.
    USPC .......................... 713/400; 709/208; 375/364

(58) Field of Classification Search
    USPC ....................................................... 713/400
    See application file for complete search history.

(56) References Cited

U.S. PATENT DOCUMENTS

| | | | |
|---|---|---|---|
| 3,641,505 A * | 2/1972 | Artz et al. | 710/100 |
| 3,917,916 A * | 11/1975 | Ghosh et al. | 370/243 |
| 5,301,122 A * | 4/1994 | Halpern | 702/62 |
| 6,643,343 B1 * | 11/2003 | Miller et al. | 375/364 |
| 7,064,681 B2 | 6/2006 | Horstemeyer | |
| 7,113,110 B2 | 9/2006 | Horstemeyer | |
| 7,119,716 B2 | 10/2006 | Horstemeyer | |
| 7,190,704 B2 | 3/2007 | Rabenko et al. | |
| 7,239,650 B2 | 7/2007 | Rakib et al. | |
| 7,319,414 B2 | 1/2008 | Horstemeyer | |
| 7,479,899 B2 | 1/2009 | Horstemeyer | |
| 7,479,900 B2 | 1/2009 | Horstemeyer | |
| 7,479,901 B2 | 1/2009 | Horstemeyer | |
| 7,482,952 B2 | 1/2009 | Horstemeyer | |
| 7,504,966 B2 | 3/2009 | Horstemeyer | |

(Continued)

OTHER PUBLICATIONS

International Search Report dated Aug. 24, 2011.

(Continued)

*Primary Examiner* — Suresh Suryawanshi
(74) *Attorney, Agent, or Firm* — Pillsbury Winthrop Shaw Pittman LLP

(57) ABSTRACT

Systems and methods for synchronizing a clock at a customer premises equipment (CPE) location with a master clock at a central office (CO) location are described. One embodiment is a method that comprises receiving, by a time-of-day transmission convergence (ToD-TC) module in the CPE, ToD information relating to the master clock. Based on the received information, time stamps are applied to reference data samples. The method further comprises transporting the ToD information by transporting the reference data samples with applied time stamps and utilizing time stamps of the reference data samples to synchronize the CPE clock with the master clock.

23 Claims, 13 Drawing Sheets

(56) References Cited

U.S. PATENT DOCUMENTS

| | | | |
|---|---|---|---|
| 7,528,742 B2 | 5/2009 | Horstemeyer | |
| 7,538,691 B2 | 5/2009 | Horstemeyer | |
| 7,561,069 B2 | 7/2009 | Horstemeyer | |
| 7,876,239 B2 | 1/2011 | Horstemeyer et al. | |
| 7,876,791 B2 * | 1/2011 | Jung et al. | 370/503 |
| 8,116,405 B2 * | 2/2012 | Cho et al. | 375/316 |
| 2002/0034196 A1 | 3/2002 | Tzannes | |
| 2004/0254811 A1 | 12/2004 | Horstemeyer | |
| 2005/0286424 A1 | 12/2005 | Peeters et al. | |
| 2009/0034672 A1 | 2/2009 | Cho et al. | |
| 2010/0115047 A1 | 5/2010 | Briscoe et al. | |

OTHER PUBLICATIONS

Broadcom: "G.vdsl: Proposed Text for Distribution of Time-of-Day Over VDSL2 Links", ITU, Q4/15, C-855, May 2010, pp. 1-19.

Huawei, China Telecom, MIIT of P.R. China: "G.vdsl: Distribution of Time-of-Day over VDSL2 Links", ITU, Proposed Text for C-1046, May 2010, pp. 1-19.

Huawei, "G.vdsl: More on Distribution of Time-of-Day over Vdsl 2 Links", ITU, C-1045, May 2010, pp. 1-7.

Ikanos, "G.vdsl: Method for Transporting Time-of-Day in VDSL2 Sytems", ITU, C-812, May 2010, pp. 1-4.

Alcatel-Lucent, "ADSL, G.vdsl, G.shdsl: Packet Jitter on DSL Links", ITU-T Q4/15 Contribution 10HA-025, Mar. 22-26, 2010, pp. 1-8.

Alcatel-Lucent, "VDSL: Distribution of Time-of-Day Over VDSL2 Links", ITU-T Q4/15 Contribution 10HA-028, Mar. 22-26, 2010.

Broadcom, "G.VDSL: Transport of Phase Synchronous Clock", ITU-T Q4/15 Contribution 10HA-031, Mar. 22-26, 2010, pp. 1-5.

China Unicom, MIIT of China, "Asymmetry in Propagation of Times of DSL Systems", ITU-T Q4/15 Contribution 10GS-044, Jan. 11-15, 2010, pp. 1-14.

Huawei, CT, MITI, "G.vdsl: A Method for Accurate Distribution of Time-of-Day Over VDSL2 Links", ITU, Q4/15 Contribution 10HA-034, Mar. 22-26, 2010, pp. 1-3.

Huawei, CT, MIIT, "G.vdsl: Precision Requirements for Time/Phase Synchronization Over VDSL2 Links", ITU , Q4/15 Contribution 10HA-054, Mar. 22-26, 2010, pp. 1-3.

Ikanos Communications and Huawei Technologies, "G.vdsl: Proposed Time-of-Day Working Text Update per Agreements Reached at the Aug. 2010 Z4/15 meeting in Mechelen", ITU-T Q4/15 Contribution 10RB-042, Nov. 15-18, 2010, pp. 1-24.

Ikanos Communications and Lantiq, "G.vdsl: Processing of Time Stamps for Frequency and Phase Synchronization", ITU, Q4/15 Contribution 10MB-050, Aug. 30-Sep. 2, 2010, pp. 1-5.

Ikanos, "G.vdsl: Method for Phase Synchronization VDSL Local Clocks in Support of ToD Transport", ITU, SG15 Contribution C-813, May 31-Jun. 12, 2010, pp. 1-4.

MIIT of China, China Unicom, "G.gen: G.vdsl: ADSL: Phase Synchronization in Layer 2", ITU, SG15 Contribution, C-561, Sep. 2009, pp. 1-5.

MIIT of China, China Unicom, "G.gen: G.vds: Requirement of Phase Synchronization in DSL System", ITU, Q4/SG15 Contribution 09XC-048, Jul. 2009, pp. 1-3.

Huawei Technologies, "G.vdsl: 1PPS with ToD Signal Format", ITU, 4/15, 10MB-053, Sep. 2010, pp. 1-4.

Alcatel-Lucent, "VDSL: Time-of-Day Interface at Gamma Reference Point", ITU, Q4/15, Nov. 2010, 10RB-026, pp. 1-4.

IEEE 1588-2008, "IEEE Standard for a Precision Clock Synchronization Protocol for Networked Measurement and Control Systems", Jul. 24, 2008, 269 pages.

* cited by examiner

SYSTEMS AND METHODS FOR TRANSPORTING TIME-OF-DAY INFORMATION IN A COMMUNICATION SYSTEM

CROSS-REFERENCE TO RELATED APPLICATION

This application claims priority to, and the benefit of, U.S. Provisional Patent Application entitled, "G.vdsl METHOD FOR TRANSPORTING TIME-OF-DAY IN VDSL SYSTEMS," having Ser. No. 61/332,851, filed on May 10, 2010, which is incorporated by reference in its entirety. This application also claims priority to, and the benefit of, U.S. Provisional Patent Application entitled, "Frequency and Phase Synchronization Method for Time-of-Day Transport in VDSL" having Ser. No. 61/371,572, filed on Aug. 6, 2010, which is also incorporated by reference in its entirety. This application also claims priority to, and the benefit of, U.S. Provisional Patent Application entitled, "G.VDSL: Frequency Synchronization of Time Stamping Clocks in VDSL ToD Transport" having Ser. No. 61/429,737, filed on Jan. 4, 2011, which is also incorporated by reference in its entirety. This application also claims priority to, and the benefit of, U.S. Provisional Patent Application entitled, "G.VDSL: Frequency Synchronization of Time Stamping Clocks in VDSL ToD Transport" having Ser. No. 61/429,855, filed on Jan. 5, 2011, which is also incorporated by reference in its entirety.

TECHNICAL FIELD

The present disclosure generally relates to communication systems and particularly, to transporting time-of-day information in a communication system.

BACKGROUND

There is much interest in utilizing very high bitrate digital subscriber line (VDSL) systems in the mobile back haul network, which requires the transport of time of day information to accurately synchronize network clocks at remote locations to a grandmaster clock somewhere else in the network. In a VDSL system, a local clock in a VTU-O (VDSL transceiver unit at the optical network unit within a central office (CO) or remote terminal location defines the timing reference for the downstream transmit signal. The VTU-R (VDSL transceiver unit at the remote terminal) in the customer premises equipment (CPE) derives the timing from the received downstream signal, synchronizes its local clock to that of downstream signal, and uses this recovered clock as the transmit clock for the upstream signal. This loop timing configuration frequency synchronizes the upstream transmit clock with the downstream transmit clock, but phase synchronization is not achieved with the current configuration, which is an essential component for reporting time of day information across a VDSL link.

SUMMARY

One embodiment is a method for synchronizing a clock at a customer premises equipment (CPE) location with a master clock at a central office (CO) location. The method comprises receiving, by a time-of-day transmission convergence (ToD-TC) module in the CPE, ToD information relating to the master clock. Based on the received information, time stamps are applied to reference data samples. The method further comprises transporting the ToD information by transporting the reference data samples with applied time stamps and utilizing time stamps of the reference data samples to synchronize the CPE clock with the master clock.

Another embodiment is a method for synchronizing a clock at a customer premises equipment (CPE) location with a master clock at a central office (CO) location. The method comprises receiving, by a time-of-day transmission convergence (ToD-TC) module at the CO, time-of-day (ToD) information relating to the master clock. Based on the received information, time stamps are applied to reference data samples once every discrete multi-tone (DMT) super-frame. The method further comprises transporting the reference data samples with applied time stamps to the CPE and utilizing, by a time-of-day transmission convergence (ToD-TC) module at the CPE, time stamps of the reference data samples to synchronize the CPE clock with the master clock with respect to frequency and phase.

Another embodiment is a system for synchronizing a clock at a customer premises equipment (CPE) location with a master clock at a central office (CO) location. The system comprises a first time-of-day transmission convergence (ToD-TC) module at the CO configured to receive time-of-day (ToD) information relating to the master clock, the first ToD-TC module further configured to time stamp reference data samples and transmit the time stamped reference data samples to the CPE. The system further comprises a second ToD-TC module at the CPE configured to receive the time stamp reference data samples from the first ToD-TC module and synchronize the CPE clock with the master clock based on the time stamped reference data samples.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
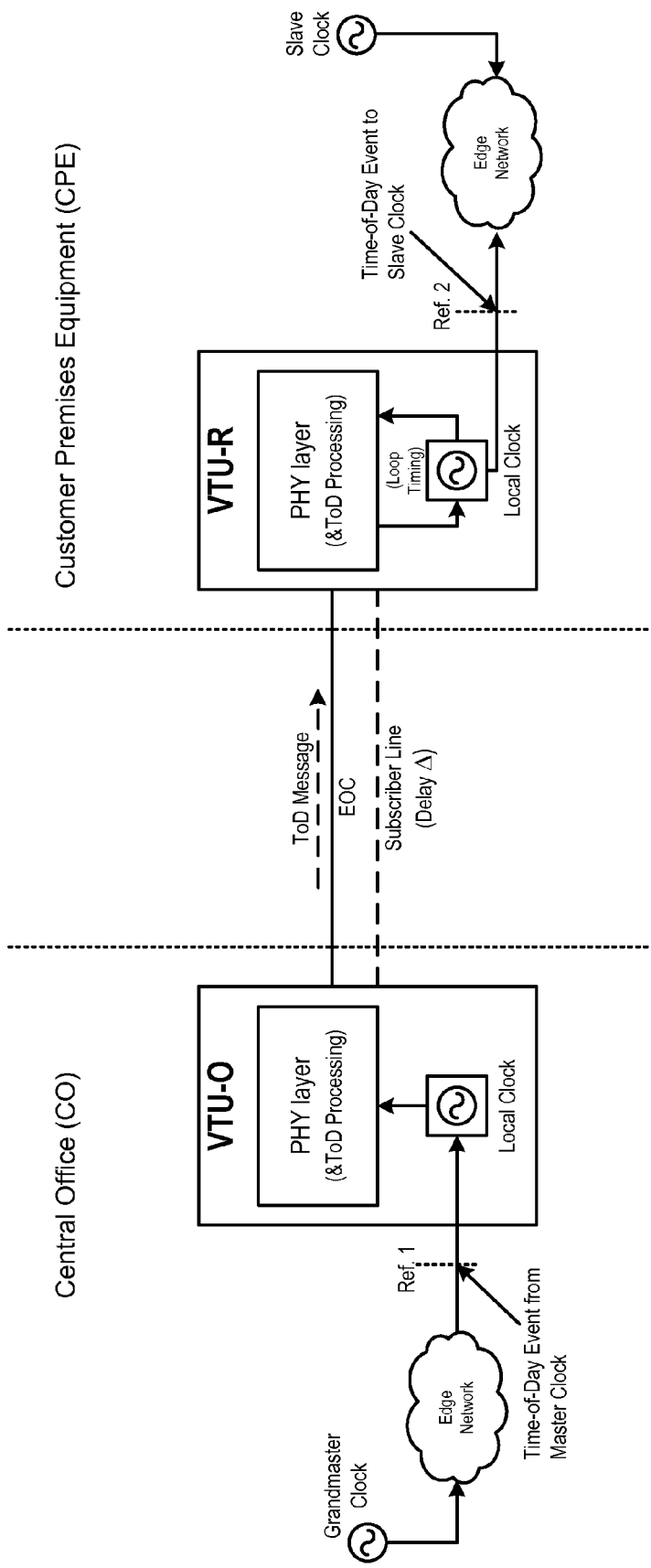
FIG. 1 which is a high-level block diagram of a VTU-O in communication with a VTU-R.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Various embodiments are described for transporting time-of-day (ToD) information across a VDSL link and synchronizing the master and slave clocks indicating the actual time-of-day. In a VDSL system, a local clock in a VTU-O (VDSL transceiver unit at the optical network unit) within a central office (CO) or Remote Terminal (RT) location defines the timing reference for the downstream transmit signal (sample clock). The VTU-R (VDSL transceiver unit at the remote location) in the customer premises equipment (CPE) derives the sample timing from the received downstream signal, synchronizes its local clock to that of the downstream signal, and uses this recovered clock as the transmit sample clock for the upstream signal (referred to as loop timing). With a loop timing configuration, the VTU-O sample clocks are frequency locked but not necessarily phase locked. Additional processing within the sample timing domain of the VDSL link is performed to facilitate frequency and phase synchronization between a master ToD clock in the CO and a slave ToD clock in the CPE.

Figure 2:
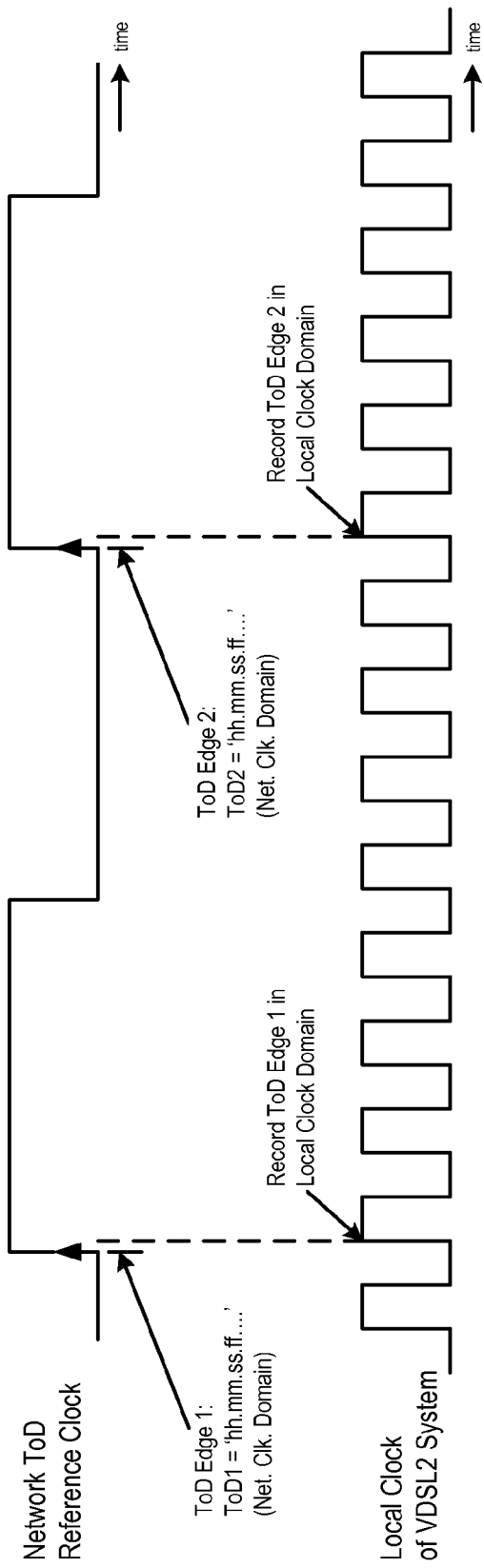
FIG. 2 illustrates the recording of a ToD value of a corresponding clock edge by the VTU-O relative to units of its internal timing domain and the recording of specific time-of-day associated with the clock edge.

Reference is made to FIG. 1, which is a high-level block diagram of a VTU-O in communication with a VTU-R. Specifically, the transporting of time-of-day (ToD) information across the subscriber line is shown. To illustrate the transmission of ToD information, consider the following scenario depicted in FIG. 1. The VTU-O receives ToD information at input point Ref.1 relative to the grandmaster clock in the network. At the moment that the ToD information (this may comprise, for example, a rising edge of the network clock and a corresponding ToD value) is received, the VTU-O records this event relative to units of its internal timing domain and records the specific time-of-day associated with that event, as illustrated in FIG. 2.

Referring back to FIG. 1, the event recorded by the VTU-O along with the corresponding time-of-day value is then communicated to the VTU-R so that a new clock edge with an adjusted time-of-day (to compensate for channel delay) is output at VTU-R interface Ref.2 for communication to the slave clock. After the VTU-O and VTU-R are phase and frequency locked, the VTU-O sends the measured time-of-day edge sample identifier and corresponding time-of-day value relative to the master clock to the VTU-R in a message (for example, a ToD Message') via the embedded operations channel EOC. The VTU-R then computes a new time-of-day edge and adjusted time-of-day value for transmission on the Ref.2 interface to the slave clock. The VTU-R also compensates for the delay introduced by the channel.

Embodiments for performing frequency synchronization of time of day or real-time clocks based on the processing of time stamps applied to downstream reference data samples sent from the CO to the CPE are first described followed by techniques for achieving phase synchronization. The VTU-O includes a real time clock used for time stamping reference data samples (i.e., a CO time stamping clock). This CO time stamping clock is synchronous to a grandmaster clock somewhere in the system with respect to both frequency and phase. For some embodiments, the time stamp is represented by 6 bytes representing the 'number of seconds' field and 4 bytes representing the 'number of nsec' field. As will be described in more detail later, however, some embodiments incorporate a compressed time stamp (for example, only two bytes). Specifically, embodiments are described for transporting a reduced number of bytes (e.g., two bytes) in the form of ToD 'phase drift' (also referred to as 'phase difference') values from the CO to the CPE on average of once per super-frame.

The implementation of the time stamp clock in the CO is generally vendor specific. For example, this clock may be derived from a northbound Ethernet connection to a grandmaster clock using the precision time protocol (PTP) of IEEE 1588-2008. The IEEE 1588-2008 standard specifies a protocol that enables precise synchronization of clocks in measurement and control systems implemented with technologies such as network communication, local computing, and distributed objects. The protocol is applicable to systems communicating via packet networks. Heterogeneous systems are enabled that include clocks of various inherent precision, resolution, and stability to synchronize.

In some cases, the local time stamping clock in the CO may be derived from a 1 PPS (pulse-per-second) output or other physical time-of-day signal from a grandmaster clock source in the CO connected to the VTU-O. In summary, the CO time stamp clock is frequency and phase synchronous to a 'northbound' grandmaster clock and this clock has its own frequency component, which may or may not be synchronous with the available 8 kHz network time reference (NTR) frequency in the CO.

Figure 3:
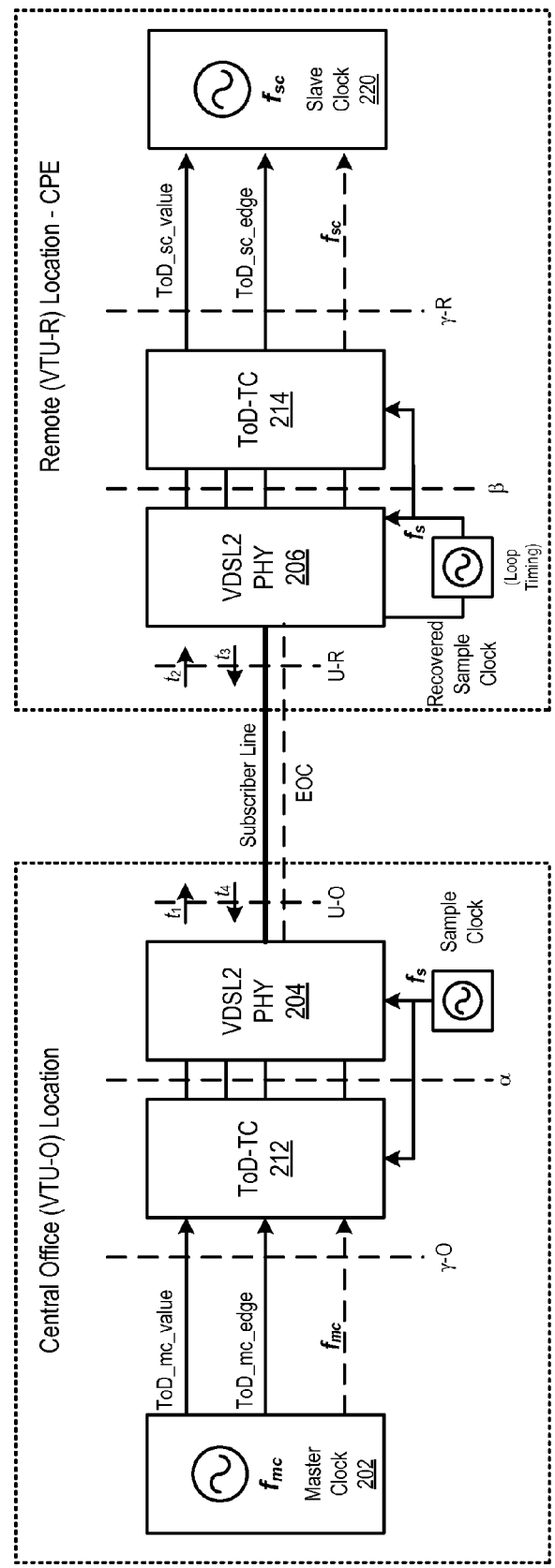
FIG. 3 depicts a detailed system reference model with various components for implementing time-of-day transport across a VDSL link in accordance with various embodiments.

Having described the basic concept for transmitting ToD information between the CO to the CPE in a VDSL system, reference is made to FIG. 3, which depicts a detailed system reference model with various components for implementing time-of-day transport across a VDSL link in accordance with various embodiments. The VTU-O in the CO receives a time-of-day signal from the master clock across the γ-O interface, and the VTU-R at the CPE side outputs a time-of-day signal across the γ-R interface to an external slave clock 220 that is made synchronous in frequency and phase with respect to the master clock 202 at the CO.

The master clock source 202 at the CO side provides time-of-day information to the VTU-O across the γ-interface. As shown in FIG. 3, the time-of-day information comprises a time-of-day value (ToD_mc_value) and a corresponding clock edge (ToD_mc_edge) that is synchronous to the master clock's 202 internal driving frequency. A component of the master clock driving frequency may be available to the VTU-O to facilitate time-of-day transport processing. At the VTU-R side, the time-of-day information at the VTU-R comprises a time-of-day value (ToD_sc_value) and a corresponding time edge marker (ToD_sc_edge) that is synchronous to the driving frequency of the master clock 202.

Figure 4A:
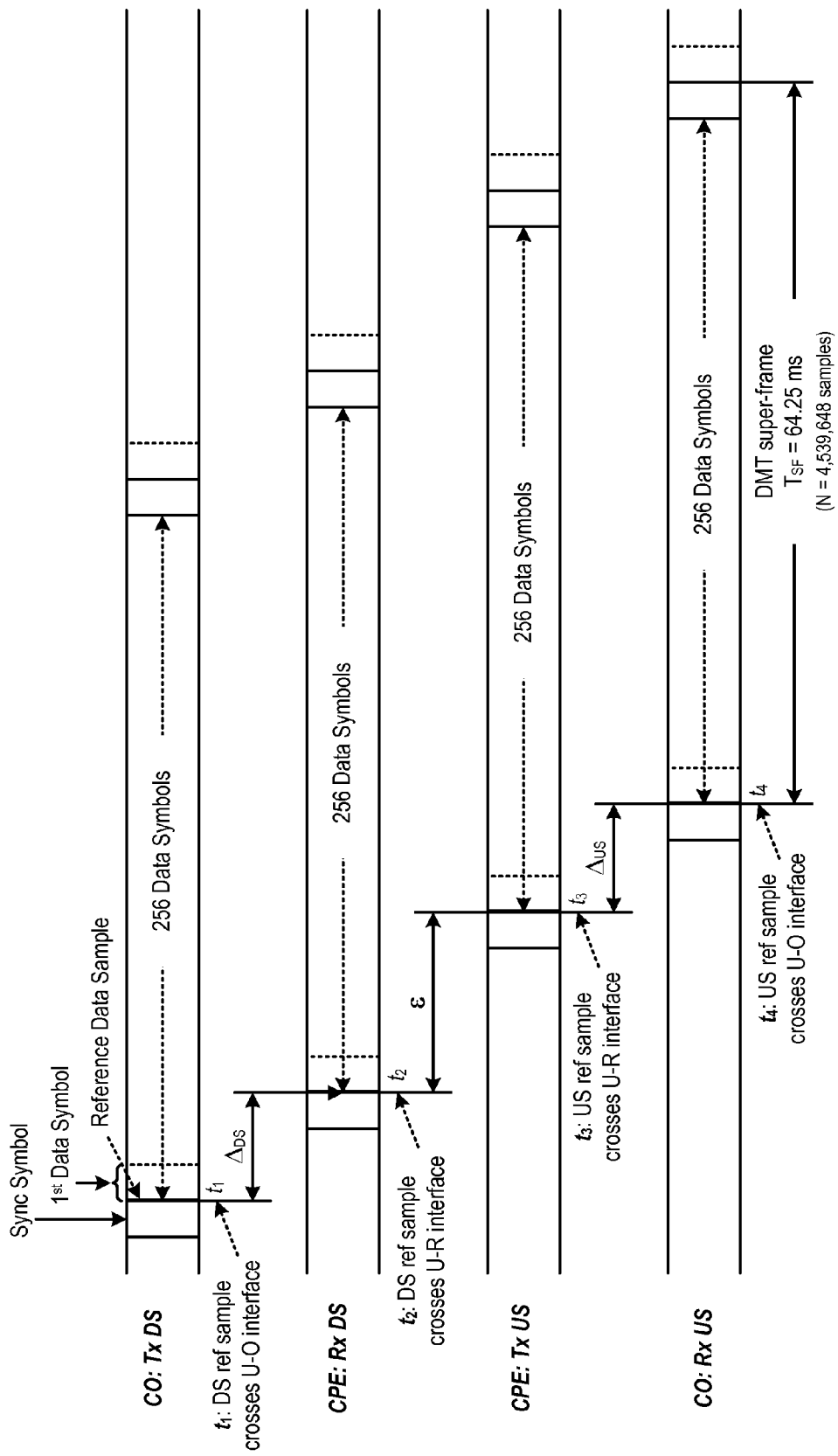
FIG. 4A illustrates the reference data samples being defined as the first data sample in a super-frame immediately following the sync symbol.

The VDSL PHY (physical) interfaces 204, 206 operate with a sample clock for transmission of discrete multi-tone (DMT) symbols on the subscriber line. In accordance with various embodiments, the upstream and downstream sample clocks are frequency locked, typically via loop timing in the VTU-R. Referring briefly to FIG. 4A, for both the upstream and downstream transmit signals, the reference data sample for this example is defined to be the first data sample in a super-frame immediately following the sync symbol.

Figure 4B:
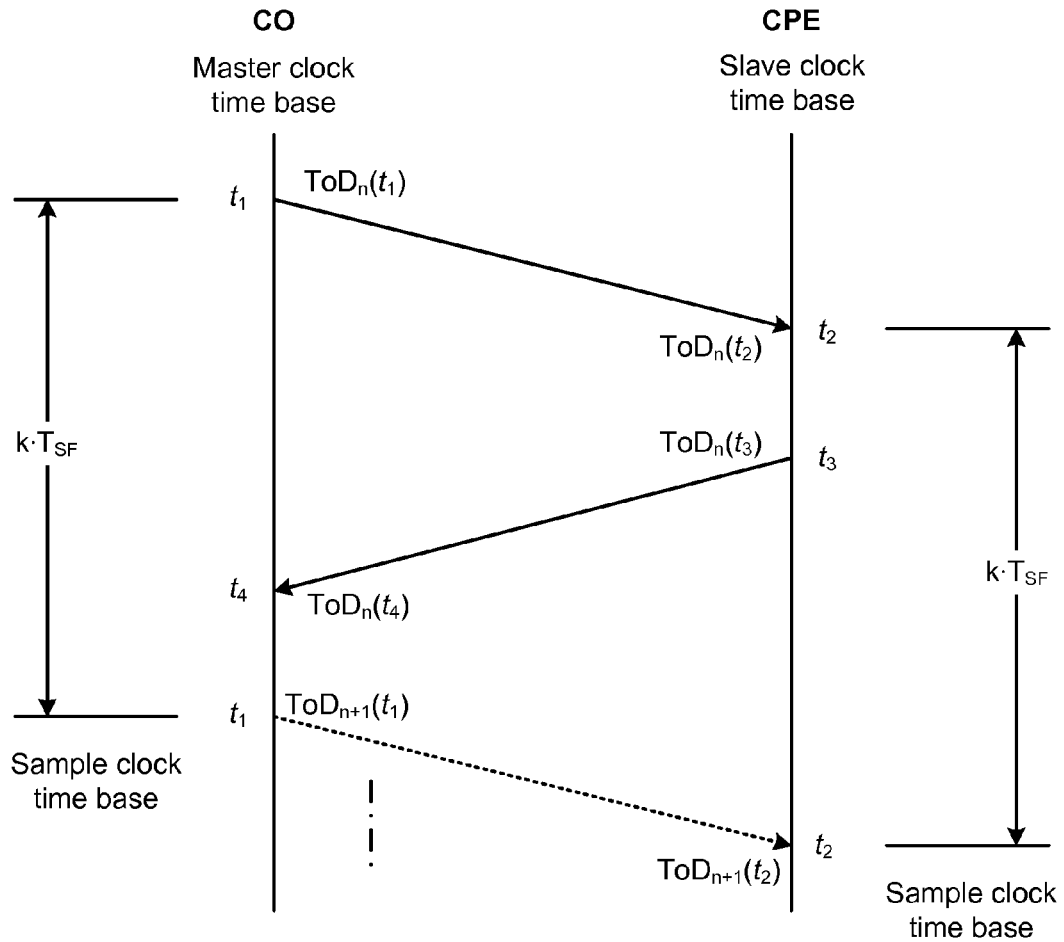
FIG. 4B illustrates a timing diagram for the communication of time stamp values between the CO and CPE.

FIG. 4B shows an alternative timing diagram for identification for the reference sample time stamp events t1, t2, t3, and t4 using the sample clock time base and the assignment of time stamp values of $ToD_n(t_1)$ and $ToD_n(t_1)$ with the master clock time base and $ToD_n(t_2)$ and $ToD_n(t_3)$ with the slave clock time base. Time stamps may be applied every super-frame interval ($T_{SF}$) or every integer number of super-frames ($k \cdot T_{SF}$). The value of k may be vendor configurable. Having available the upstream and downstream values, the average offset of the master and slave time clocks may be computed using the following equation:

$$\tau = \frac{(ToD_n(t_2) - ToD_n(t_1)) - (ToD_n(t_4) - ToD_n(t_3))}{2}$$

Referring back to FIG. 3, the VDSL PHY interface 204 in the VTU-O identifies the moment the downstream reference data sample crosses the U-O interface (denoted by event $t_1$) and the upstream reference data sample crosses the U-O interface (denoted by event $t_4$). When each event occurs, the ToD-TC (time-of-day—transmission convergence) module 212 in the VTU-O performs a time stamping operation and records the corresponding time values of the master clock to apply a time stamp to each of the respective events $t_1$ and $t_4$. These time stamps together with an identifier of the super frame are communicated to the VTU-R via the embedded operations channel EOC.

Similarly, the VDSL PHY interface 206 in the VTU-R identifies the moment the downstream reference data sample crosses the U-R interface (denoted by event $t_2$) and the upstream reference data sample crosses the U-R interface (denoted by event $t_3$). When each event occurs, the ToD-TC module 214 in the VTU-R records the corresponding time of the local slave clock to apply a time stamp to each of the respective events $t_2$ and $t_3$. The ToD-TC module 214 in the VTU-R processes the time stamp values of events $t_1$, $t_2$, $t_3$, and $t_4$ so as to time synchronize the local slave clock to the master clock. Note that the time period between consecutive reference data samples is fixed to the number of data samples in a super-frame that is locked to the modem's sample clock. Based on this relationship, the time stamp values are supplied via reference data samples at regularly repeating intervals.

FIG. 4A further illustrates how the downstream and upstream reference data samples are defined. Transmission of the reference data samples is synchronous with the CPE data sample clocks. The upstream and downstream sample clocks are assumed to be frequency synchronous with each other via loop timing or some other synchronizing mechanism. Time stamps are applied to the downstream reference data samples as they cross the U reference. The reading of the time stamp clocks is triggered by a timing mechanism that is synchronous to the sample clock and is identified as event (t1). The time stamp values are taken from the time base of the time stamping clock, which runs asynchronously with the time base of the data sample clock. FIG. 4B illustrates a timing diagram for the communication of time stamp values between the CO and CPE.

Figure 5A:
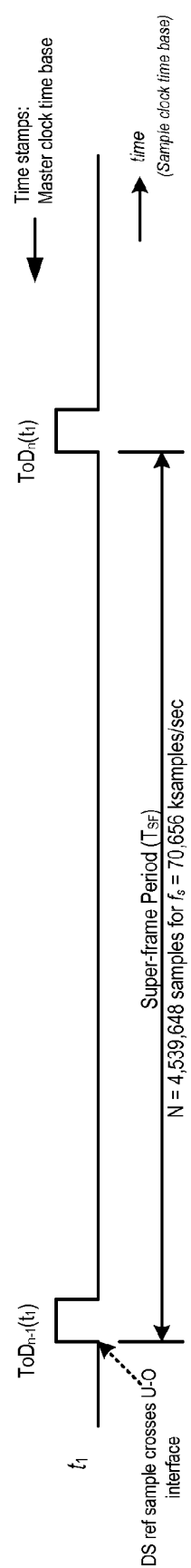
FIGS. 5A-B illustrate the assignment of time stamp values to reference data samples in the downstream and upstream directions.
Figure 5B:
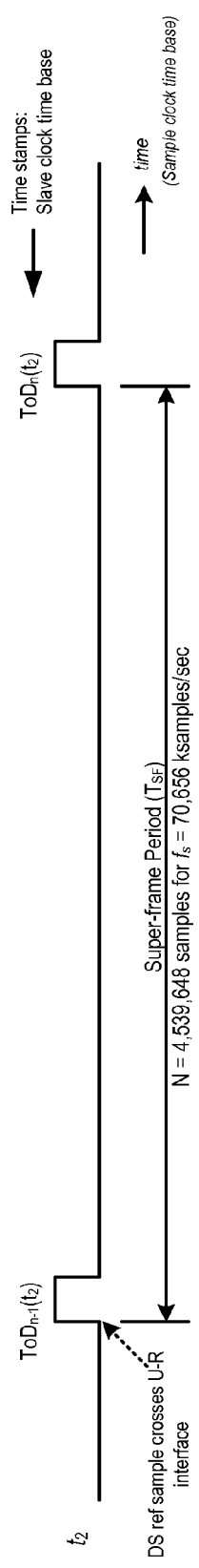

Reference is made to FIGS. 5A-B. FIG. 5A shows the assignment of time stamp values ToDn(t1) by the VTU-O (FIG. 3) to the downstream reference data sample as it crosses the U-O reference point. FIG. 5B shows the assignment of time stamp values ToDn(t2) by the VTU-R to the downstream reference data sample as it crosses the U-R reference point. In both cases (FIG. 5A and FIG. 5B), n is an index to the time stamp measurements synchronous to the super-frame (SF) clock (and hence the data sample clock). The number of data sample intervals between the reference data samples is generally fixed. For example, assuming a sample clock of 70,656 kHz, there are 4,539,648 data samples in a super-frame in the nominal super-frame time interval of 64.25 ms. Since the sample clocks in the CO and CPE modems are frequency-locked with each other, the period between sequential time stamps applied in the CO will be the same for the time stamps applied in the CPE on the received downstream signal.

At the CO, the time difference between successive reference data samples is observed based on applied time stamp values—that is, $\Delta T_n(t_1) = ToD_n(t_1) - ToD_{n-1}(t_1)$, as illustrated in FIG. 5A. For a stable master time stamp clock frequency and a stable sample clock frequency, the sequential values of $\Delta T_n(t_1)$ should be relatively constant. With reference to FIG. 5B, at the CPE side, the time difference between successive time stamp values is represented by $\Delta T_n(t_2) = ToD_n(t_2) - ToD_{n-1}(t_2)$. If the time stamp clock in the CPE is frequency-locked to the time stamp clock in the CO, then corresponding time differences between successive time stamp values should be the same (i.e., $\Delta T_n(t_2) = \Delta T_n(t_1)$). Consequently, if $\Delta T_n(t_2) \neq \Delta T_n(t_1)$, then the frequency of the time stamp clock in the CPE is adjusted such that $\Delta T_n(t_2) = \Delta T_n(t_1)$ so that the master clock and the CPE clock are frequency locked.

Figure 6A:
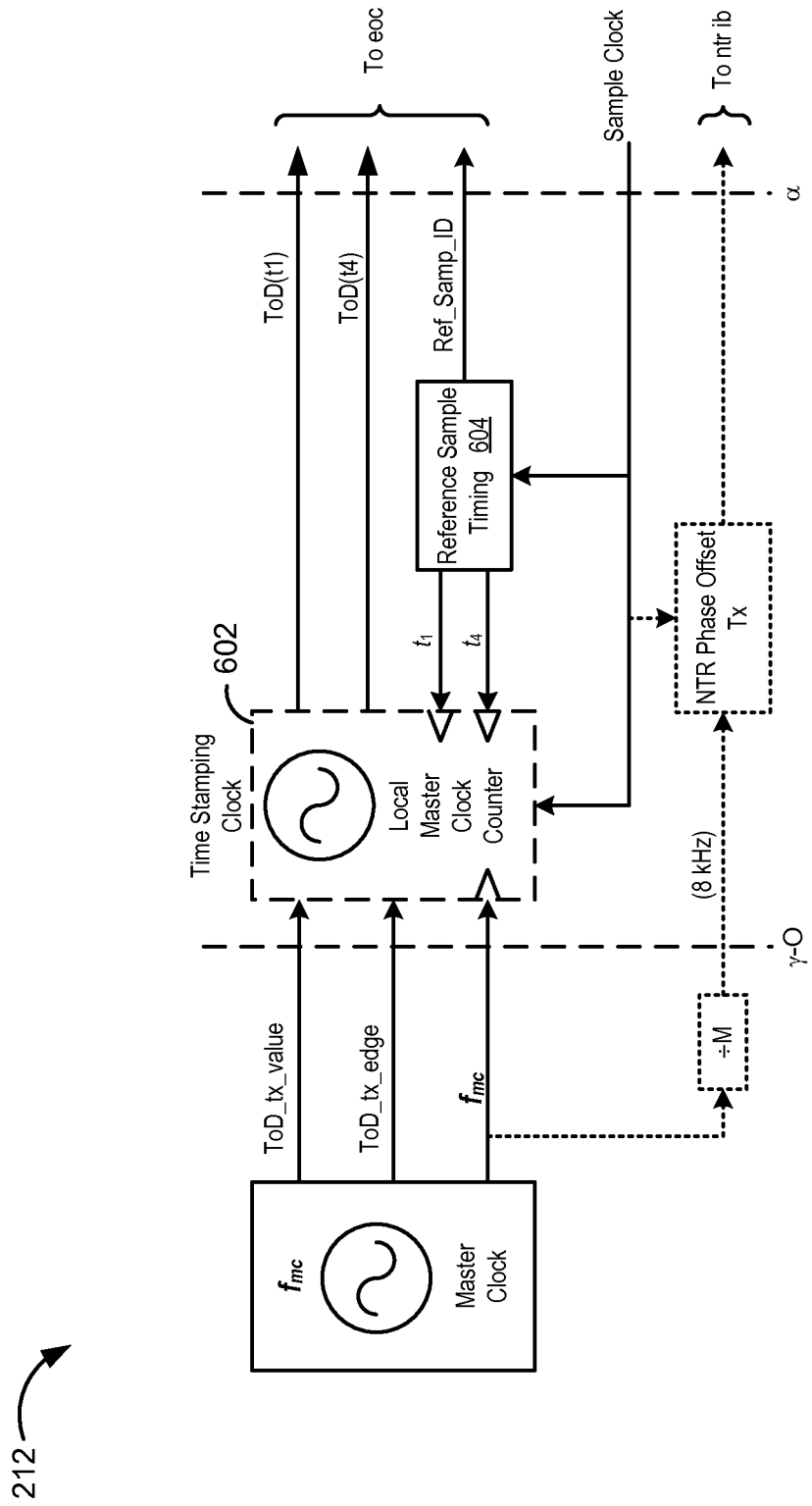
FIG. 6A is an embodiment of the ToD-TC module in FIG. 3 implemented in the VTU-O.

Reference is made to FIG. 6A, which is an embodiment of the ToD-TC module 212 in FIG. 3 implemented in the VTU-0. The ToD-TC module 212 in the VTU-O receives the time-of-day signals from the master clock (FIG. 1) and assigns time stamps to reference data samples per the master clock time base. The local time stamping clock 602 in the ToD-TC module 212 implements a clock that is synchronized to the external master clock for the purpose of applying time stamps to the reference data samples. The VDSL2 PHY interface 204 (FIG. 3) identifies the moment that the reference data samples cross the U-O interface. The reference sample timing block 604 generates pulses t1 and t4, for reading the value of the time stamping clock 602 in recording the respective time stamps for the downstream and upstream reference data samples. The time stamp values, ToD(t1) andToD(t4) together with the reference sample identification (Ref_Samp_ID) are sent to the VTU-R via the EOC. Frequency synchronization of the time stamping clock in the VTU-R may be performed using any of the methods described above for the LTR in the VTU-O. FIG. 6A illustrates the option of using the NTR-TC of VDSL for the transport of an 8 kHz network timing reference clock to frequency synchronize the VTU-R LTR with the master clock. For various embodiments, the method of frequency synchronization is selected at initialization.

Figure 6B:
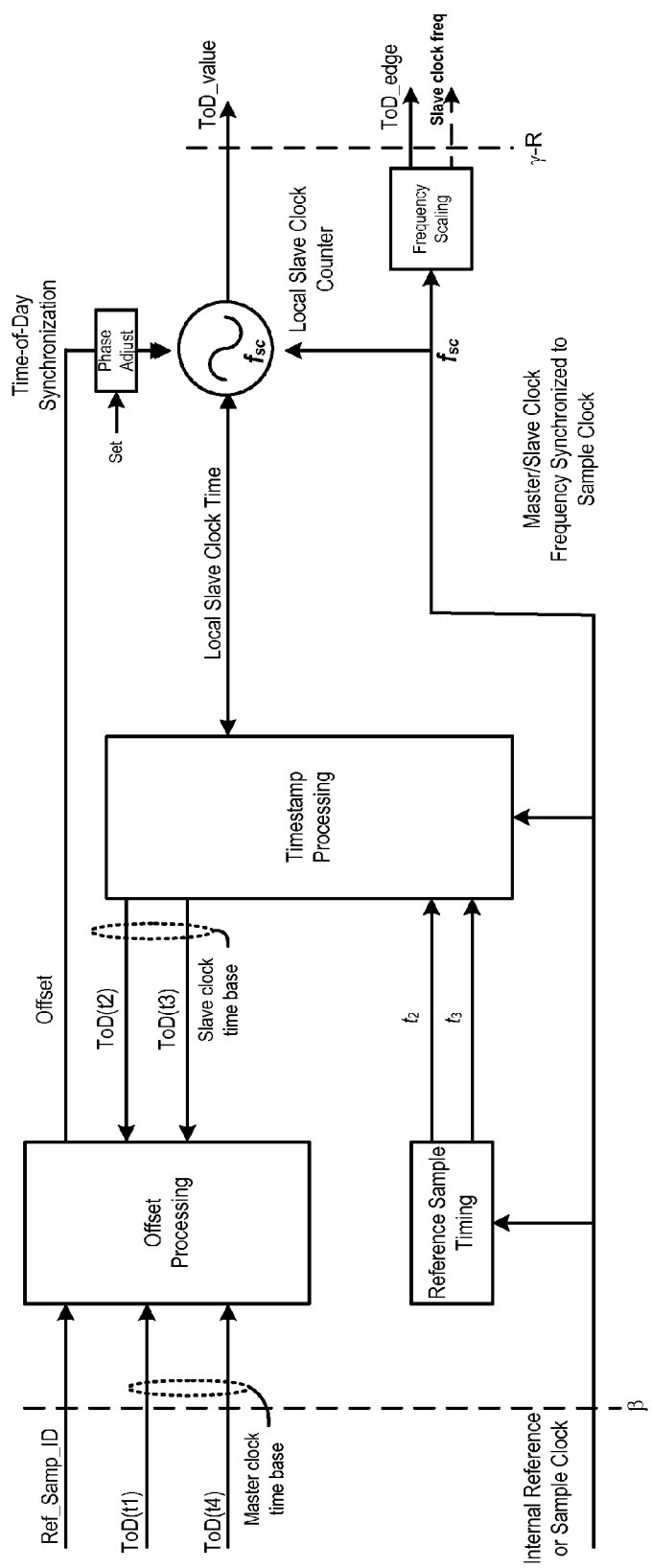
FIG. 6B is an embodiment of the ToD-TC module in FIG. 3 implemented in the VTU-R.

Reference is made to FIG. 6B, which is an embodiment of the ToD-TC module 214 in FIG. 3 implemented in the VTU-R. FIG. 6B shows the functional reference model of the ToD-TC in the VTU-R for the case where the PMD sample clock is frequency locked to the ToD network clock. In this case, the time stamping clock may be driven directly from the sample clock since it is frequency locked to the network clock. The time (phase) synchronization is done via the processing of the reference sample time stamps, as described earlier in connection with FIG. 4A.

Figure 7:
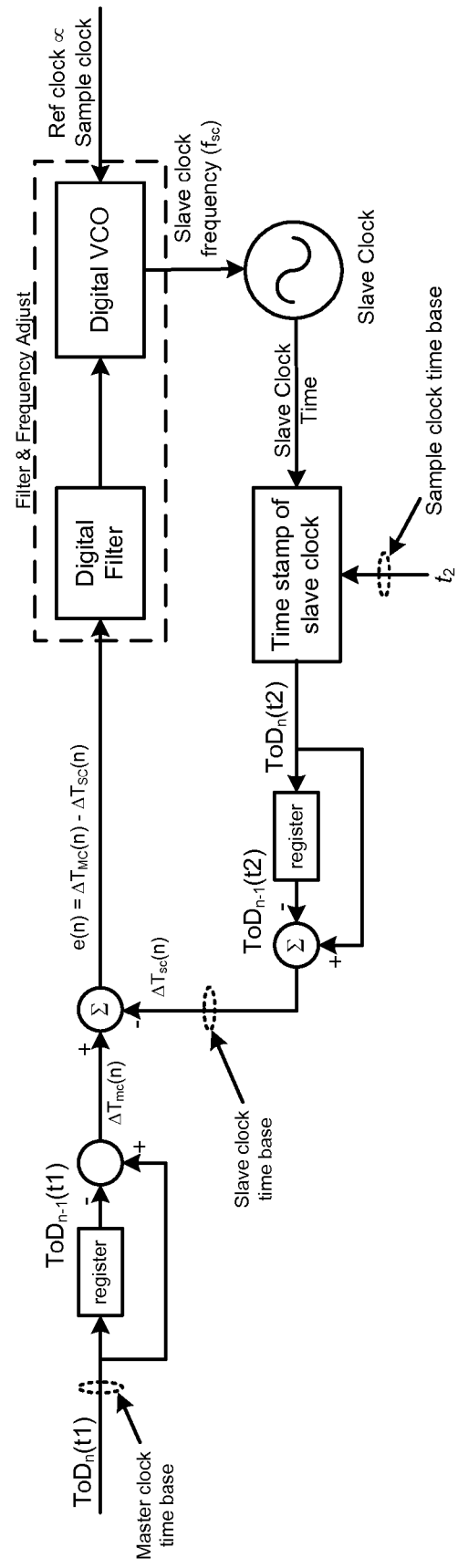
FIG. 7 illustrates a phase lock loop for processing the time difference between successive time stamp values.

For some embodiments, the receiver comprises a phase locked loop (PLL) such as the one shown in FIG. 7, where the PLL is configured to ensure that $\Delta T_n(t_2)$ converges toward $\Delta T_n(t_1)$ such that $\Delta T_n(t_2)=\Delta T_n(t_1)$ in order to achieve frequency lock between the CO and CPE time stamping clocks. Assume that the CO time stamp clock has a frequency tolerance of $\alpha_m$ and that the sample clock has a frequency tolerance of $\alpha_l$. Nominally, the value of $\Delta T_n(t_1)$ is 64.25 ms. However, note that this value may vary by the difference of the two tolerances. Based on this, $\Delta T_n(t_1)=64.25\times(1+\alpha_m-\alpha_l)$ ms. For each sample of $\Delta T_n(t_1)$, the nominal 64.25 ms may be removed, thus leaving the drift value of $64.25\times(\alpha_m-\alpha_l)$ ms, which is the range that the timing recovery circuit in the CPE will need to track.

Figure 8:
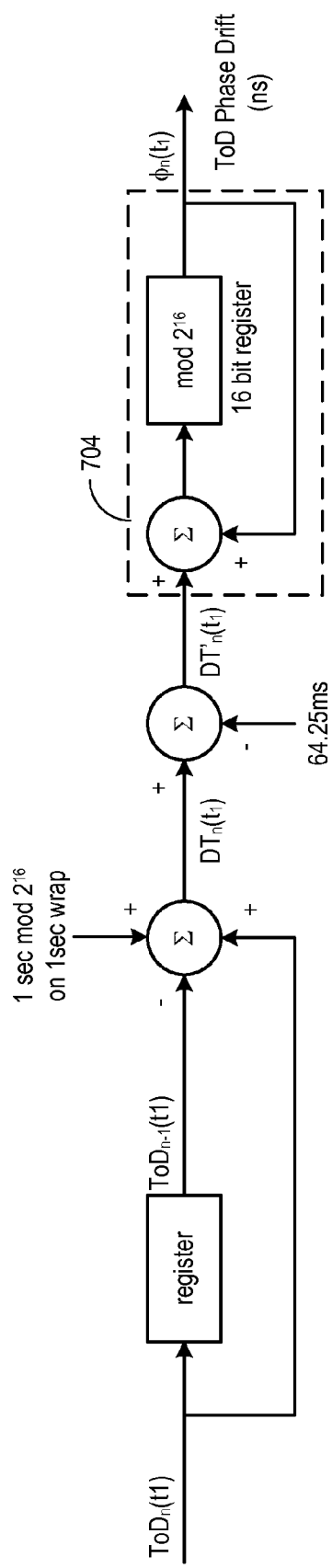
FIG. 8 illustrates the computation of the drift value.

Further embodiments are now described for achieving frequency synchronization between the CO and CPE clocks. This approach significantly reduces the amount of information to be communicated from CO to CPE each super-frame period for frequency synchronization. Reference is made to FIG. 8, which illustrates the computation of a drift value $\Delta T'_n(t_1)=ToD_n(t_1)-ToD_{n-1}(t_1)-64.25$ ms used for adjusting the phase. Assume that the CO time stamp clock uses the time stamp format representation of 6 bytes for the seconds field and 4 bytes for the nsec field. Based on this assumption, the least significant bit of the nsec field represents 1 nsec. Note that each second after a count of 1 sec=$10^9$ nsec=$3B9A CA00_{16}$ in the 4 byte field, the 4 byte nsec counter resets (i.e. wraps around) to zero. Assuming, for example, that the sample clock has a tolerance of ±50 ppm and the CO time stamp clock has a tolerance of ±32 ppm, the maximum drift would be ±82 ppm. This requires a register length of $\log_2(64.25\times10^{-3}\ s\times82\times10^{-6}\times10^9\ ns/s)=12.4$ bits for magnitude and one additional bit for sign indication (14 bits total). Hence, the phase drift information may be carried in the transport of 2 bytes of data once every super-frame on average. To facilitate self-correction or recovery resulting from transmission errors of phase drift values from the CO to the CPE, the instantaneous phase drift values $\Delta T'_n(t_1)$ is fed to an accumulator 704 that operates in the field of 2 bytes (as a non-limiting example, modulo $2^{16}$) prior to being transmitted downstream to the CPE. The output value $\phi_n(t_1)$ of the accumulator 704 is transmitted from the CO to the CPE on average once each super-frame. As another example, if the modulo operator is set to a value of 125,000 ns (=1 $E848_{16}$), the phase difference output value $\phi_n(t_1)$ of the accumulator 704 represents the phase difference between the super-frame period of the sample clock and an edge of an 8 kHz clock of the time-of-day clock.

Various means for transmitting the ToD Phase drift values from the CO to the CPE are now described. Such transmission means include use of the EOC and adding fixed bytes in the overhead (OH) frame. For some embodiments, the EOC is utilized to transport a full transmit time stamp value as well as to receive a time stamp value in support of the phase synchronization of the time stamp clock in the CPE with that in the CO. Transporting both time stamps from CO to CPE once per super-frame requires a capacity of approximately 3 kb/s in the EOC (i.e., 8 bits/byte×24 bytes divided by 64.25 ms/SF≈3 kb/s) per the frame structure.

For some embodiments, a compressed format is implemented to reduce the EOC capacity required to send drift values for performing phase synchronization. For such embodiments, an EOC command is implemented that is specific to frequency synchronization (for example, a ToD frequency synchronization command). Such a command is used where only the downstream time stamps are sent, and the EOC capacity requirement is cut in half, i.e. ≈1.5 kb/s (8 bits/byte×12 bytes divide by 64.25 ms/SF≈1.5 kb/s). Note that a time stamp index is sent with each time stamp value to identify the specific super-frame for which the time stamp applies. To further reduce the capacity in an EOC message sent once per super-frame, the message contains the following three bytes of data: one byte containing the super-frame index value to identify the specific super-frame corresponding to the reported ToD phase drift value and two bytes defining the reported ToD phase drift value. The resulting bit rate in the EOC channel is approximately 0.374 kb/s (i.e. 8 bits/byte×3 bytes divide by 64.25 ms/SF≈373.5 b/s).

As described above, some embodiments for transmitting the ToD Phase drift values from the CO to the CPE may comprise adding fixed bytes in the OH frame. In accordance with such embodiments, an expanded OH frame type (i.e., expanded OH frame Type I) is now described. Although asynchronous to the super-frame, the OH Frame is a frame that repeats every $PER_p$ ms, where the maximum interval of the OH frame is approximately 20 ms. The first six bytes in OH frame Type 1 (see Table 9-4/G.993.2) define CRCp, Syncbyte, IB-1, IB-2, IB-3, and NTR. The remaining bytes (MSG) in the OH frame carry the EOC message. Another possible approach to passing the above mentioned SF index (1 byte) and ToD phase drift value (2 bytes) is to add three bytes prior to the beginning of the MSG field as shown in Table 1 below.

TABLE 1

Modified OH frame Type 1 for ToD frequency synchronization.
OH frame Type 1

| Octet number | OH field | Description |
|---|---|---|
| 1 | $CRC_p$ | Cyclic redundancy check (9.5.2.3) |
| 2 | Syncbyte | Syncbyte = $AC_{16}$ when the OH frame indicates the start of an OH superframe, otherwise Syncbyte = $3C_{16}$. |
| 3 | IB-1 | PMD-related primitives (Note 1, Table 9-5) |
| 4 | IB-2 | PMS-TC-related primitives (Note 1, Table 9-5) |
| 5 | IB-3 | TPS-TC-related and system-related primitives (Note 1, Table 9-5) |
| 6 | NTR | Network timing reference (Note 2, 8.3) |
| 7 | [0 0 $c_5 c_4 c_3 c_2 c_1 c_0$] | SF Index Counter Value |
| 8 | [$b_7 \ldots b_2 b_1 b_0$] | Lower byte of the ToD phase drift value or non-differential NTR phase offset |
| 9 | [$b_{15} \ldots b_{10} b_9 b_8$] | Higher byte of the ToD phase drift or non-differential NTR phase offset |
| >9 | MSG | Message overhead (Note 3, 11.2) |

In the frame structure above, error detection is covered by the CRC field (byte #1) in the next OH frame. The capacity of the MSG channel is reduced by three bytes, so the message overhead data rate for the updated OH frame Type 1 is $msg_p=OR_p\times(SEQ_p-9)/SEQ_p$ and the upper lower $msg_p$ rates are scaled accordingly. The above frame structure would only be activated if the ToD capability is enabled during initialization. If use of the non-differential NTR is selected during initialization for frequency synchronization, then the contents of bytes 8 and 9 in Table 1 may be filled with non-differential NTR phase offset values.

The frame structure of Table 1 may be further simplified if during initialization, it is negotiated that ToD distribution capability is enabled but 8 kHz NTR support is not required (hence disabled). In the case that NTR is not used (i.e. disabled), then the NTR field in Table 1 may be removed and MSG field will begin with byte #8.

An expanded OH frame Type 1 with ToD frequency sync frame is now described to lessen the impact on the overhead rate. The approach described below may be used. Table 2 shows the updated OH frame Type 1 structure to include one extra fixed byte prior to the MSG field to implement a new frame for passing ToD frequency synchronization information. The new frame, referred to here as the ToD_FSync frame, carries three bytes of information as shown in Table 3. Hence, the ToD_FSync frame spans three OH frame Type 1 periods.

The CRC field in the OH frame provides error detection for each of the bytes in the frame. An advantage of limiting the ToD_FSync frame length to 3 bytes is that in all cases, a ToD_FSync value may be transmitted within one SF period (64.25 ms) for the worst case OH frame length of $PER_p=20$ ms. As mentioned earlier, if during initialization it is negotiated that ToD distribution capability is enabled but 8 kHz NTR support is not required (hence disabled), then the NTR field (byte #6) in Table 2 may be removed and MSG field will begin with byte #7.

TABLE 2

Modified OH frame Type 1 with ToD Frequency Synchronization Frame extension.
OH frame Type 1

| Octet number | OH field | Description |
|---|---|---|
| 1 | $CRC_p$ | Cyclic redundancy check (9.5.2.3) |
| 2 | Syncbyte | Syncbyte = $AC_{16}$ when the OH frame indicates the start of an OH superframe, otherwise Syncbyte = $3C_{16}$. |
| 3 | IB-1 | PMD-related primitives (Note 1, Table 9-5) |
| 4 | IB-2 | PMS-TC-related primitives (Note 1, Table 9-5) |
| 5 | IB-3 | TPS-TC-related and system-related primitives (Note 1, Table 9-5) |
| 6 | NTR | Network timing reference (Note 2, 8.3) |
| 7 | ToD_FSync | One Byte of ToD FSync Frame (See Table 3) |
| >7 | MSG | Message overhead (Note 3, 11.2) |

TABLE 3

ToD_FSync Frame Structure.

| Octet number | OH field | Description |
|---|---|---|
| 1 | [0 0 $c_5 c_4 c_3 c_2 c_1 c_0$] | SF Index Counter Value |
| 2 | [$b_7 \ldots b_2 b_1 b_0$] | Lower byte of the ToD phase drift value or non-differential NTR phase offset |
| 3 | [$b_{15} \ldots b_{10} b_9 b_8$] | Higher byte of the ToD phase drift or non-differential NTR phase offset |

In accordance with alternative embodiments, an expanded OH frame type 2 may be utilized for passing ToD frequency synchronization data. The modified OH frame Type 2 structure is shown in Table 4. With expanded OH frame Type 2, there is no penalty to the EOC message overhead rate because the EOC is carried only in OH frame Type 1 in a separate latency path.

Note that in each of the transport methods described above, simultaneous support of ToD distribution and transport of independent 8 kHz NTR synchronous to the SDH/PCM network is provided.

TABLE 4

Modified OH frame Type 2 for ToD frequency synchronization.
OH frame Type 2

| Octet number | OH field | Description |
|---|---|---|
| 1 | $CRC_p$ | Cyclic redundancy check (9.5.2.3) |
| 2 | Syncbyte | Syncbyte = $AC_{16}$ when the OH frame indicates the start of an OH superframe, otherwise Syncbyte = $3C_{16}$. |
| 3 | Reserved for allocation by ITU-T | The value for the reserved field shall be $FF_{16}$. |
| 4 | [0 0 $c_5 c_4 c_3 c_2 c_1 c_0$] | SF Index Counter Value |
| 5 | [$b_7 \ldots b_2 b_1 b_0$] | Lower byte of the ToD phase drift value or non-differential NTR phase offset |
| 6 | [$b_{15} \ldots b_{10} b_9 b_8$] | Higher byte of the ToD phase drift or non-differential NTR phase offset |
| >6 | Reserved for allocation by ITU-T | The value for the reserved field shall be $FF_{16}$. (NOTE 4) |

Figure 9:
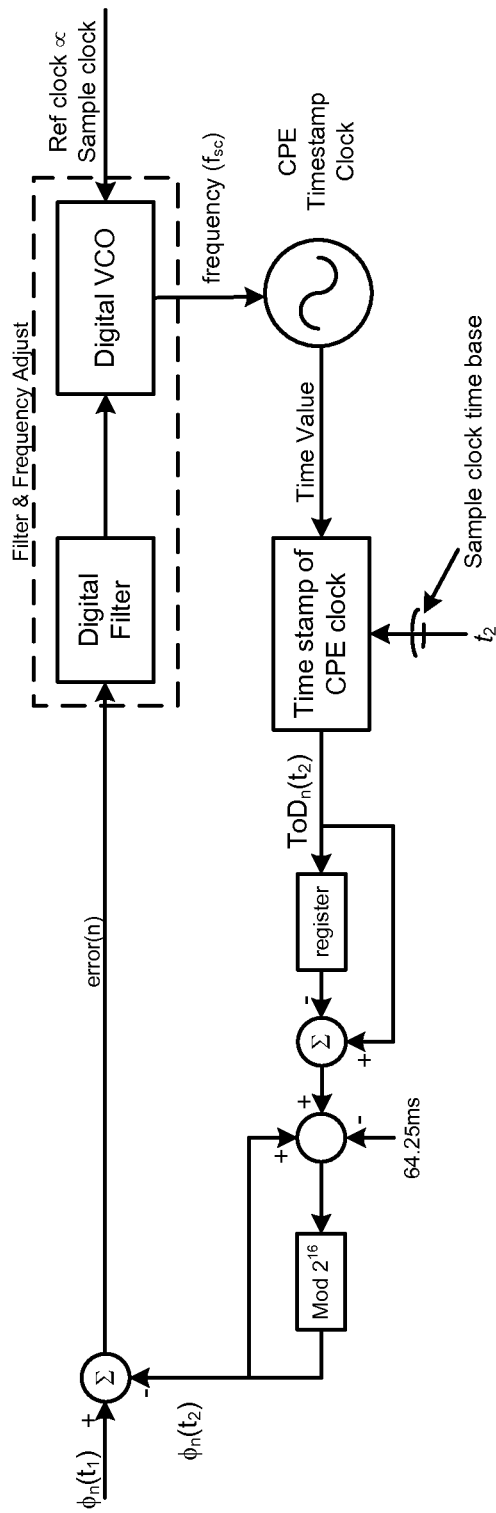
FIG. 9 shows an embodiment of a control loop for frequency synchronizing the CPE time stamp clock with the frequency of the CO time stamp clock.

FIG. 9 shows an embodiment of a control loop for frequency synchronizing the CPE time stamp clock with the frequency of the CO time stamp clock. This approach for frequency synchronization is useful for cases where a locked 70,656 kHz clock is not available in the CPE. For example, in a case where digital interpolation is used for data recovery, frequency synchronization of time stamp clocks can be obtained without the use of a locked 70,656 sample clock. Furthermore, note that although the time stamp data format is defined to a precision of 1 nsec in the reporting of time stamp values, the actual precision of the time stamp clocks in a given implementation is vendor specific. Hence, frequency synchronization to within a degree of phase accuracy of 1 nsec may be achieved, assuming that the actual time stamp clocks support that timing accuracy.

Figure 10:
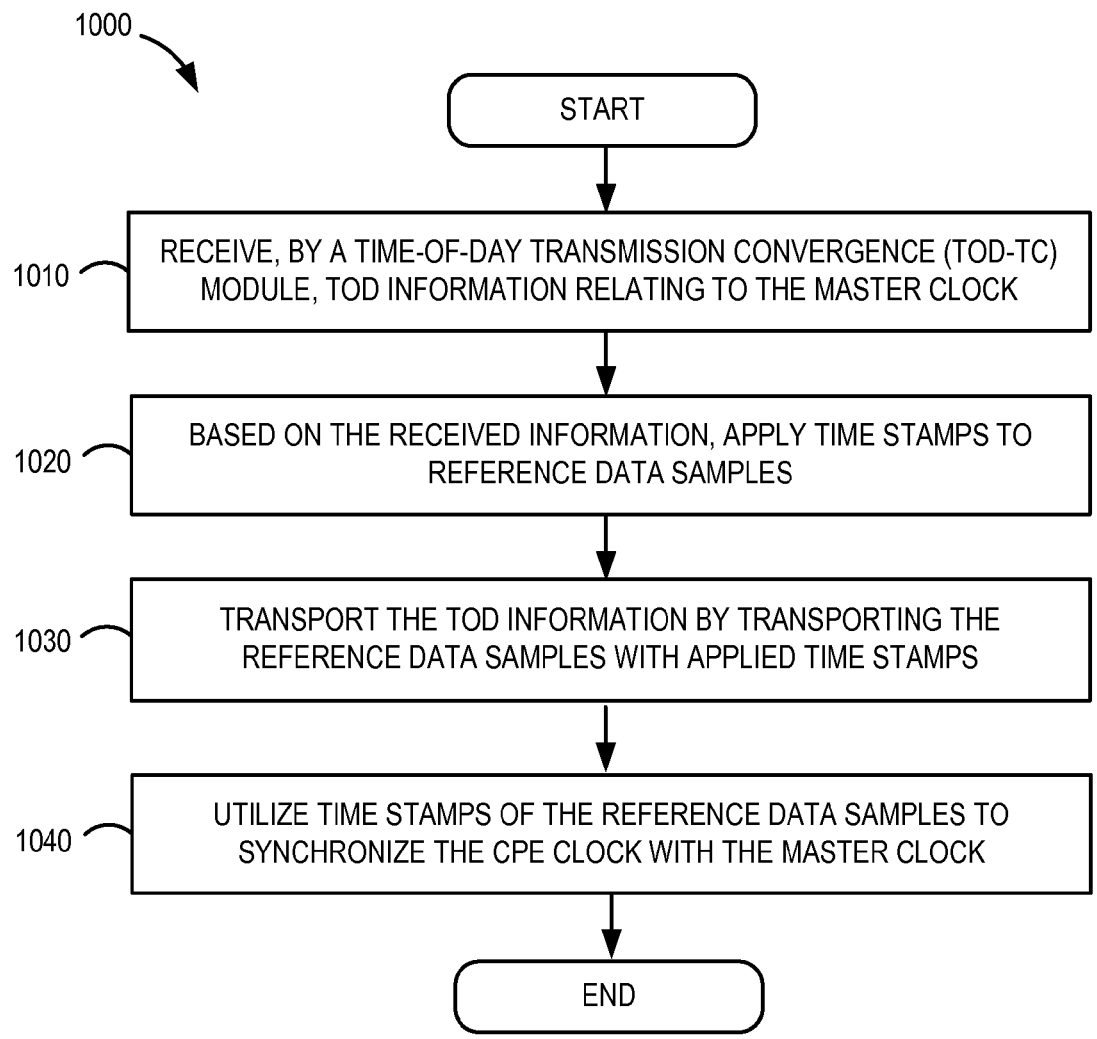
FIG. 10 is a flowchart for an embodiment of transporting time-of-day information implemented in the system of FIG. 3.

Reference is made to FIG. 10, which depicts a flowchart 1000 in accordance with an embodiment for synchronizing a clock at a CPE with a master clock at the CO. If embodied in software, each block depicted in FIG. 10 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor implemented in the CPE or the CO in FIG. 1. The machine code may be converted from the source code, etc. If embodied in hardware, each block may represent a circuit or a number of interconnected circuits to implement the specified logical function(s).

Although the flowchart 1000 of FIG. 10 shows a specific order of execution, it is understood that the order of execution may differ from that which is depicted. In block 1010, the ToD-TC module receives ToD information relating to the master clock. In block 1020, time stamps are applied to reference data samples based on the received information. In block 1030, the ToD information is transmitted to the CPE by transporting the reference data samples with applied time stamps, and in block 1040, the time stamps of the reference data samples are utilized to synchronize the CPE clock with the master clock.

Figure 11:
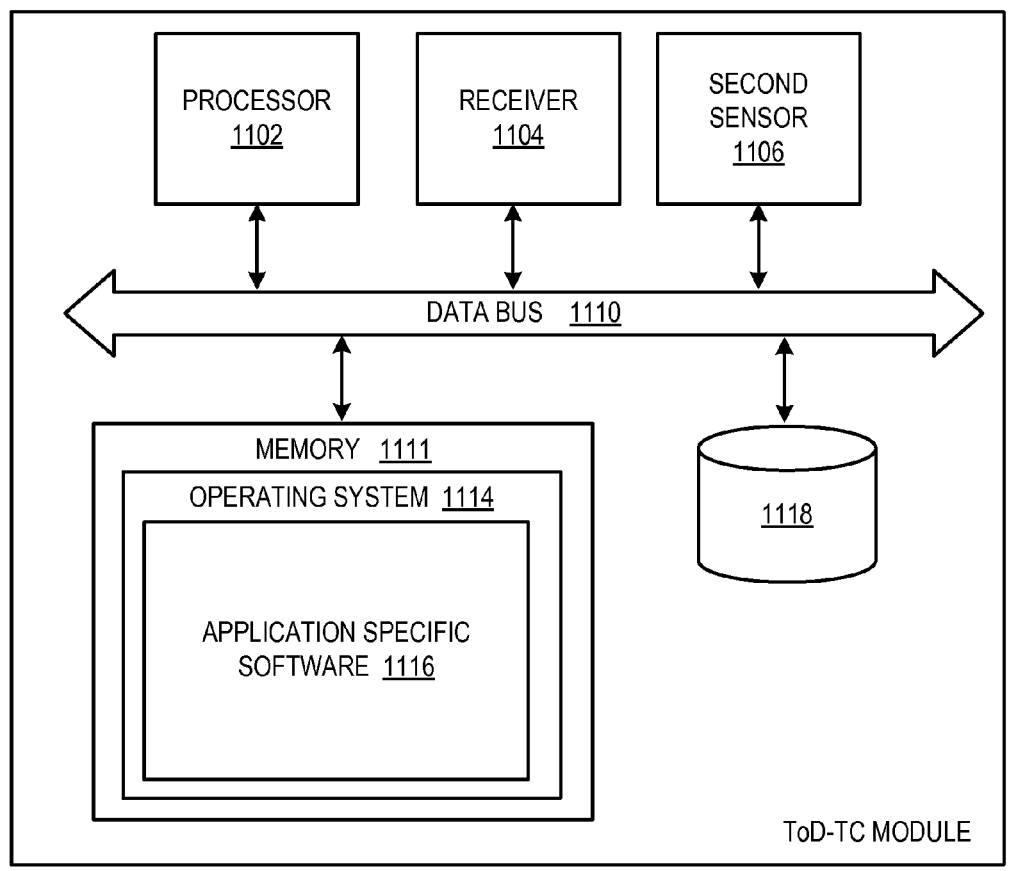
FIG. 11 is a schematic view of various components in the ToD-TC module in FIG. 3.

Reference is made to FIG. 11 is a schematic view of various components in the ToD-TC modules 212, 214 in FIG. 3. The ToD-TC modules may include a processor 1102, a memory component 1111 which may include volatile and/or nonvolatile memory components, and data storage 1118 such as mass memory that are communicatively coupled via a local interface 1110. The local interface 1110 may include other elements such as controllers, buffers (caches), drivers, repeaters, and receivers to enable communications. Further, the local interface 1110 may include address, control, and/or data connections to enable appropriate communications among the aforementioned components.

The processor 1102 in the CPE is configured to execute software stored on a tangible storage medium such as the memory component 1111. The processor 1102 can be any custom made or commercially available processor, a central processing unit (CPU), an auxiliary processor among several processors, a semiconductor based microprocessor (in the form of a microchip or chip set), a macroprocessor, or generally any device for executing software instructions. The memory component 1111 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory component 1111 may incorporate electronic, magnetic, optical, and/or other types of storage media. One should note that some embodiments of the memory component 1111 can have a distributed architecture (where various components are situated remotely from one another), but can be accessed by the processor 1102.

Software stored on the memory component 1111 may include one or more separate programs, each of which includes an ordered listing of executable instructions for implementing logical functions. For example, the software in the memory component may include an operating system 1114. Furthermore, the software residing in memory may include application specific software 1116 configured to perform some or all of the functions associated with the ToD-TC modules described herein. It should be noted that these modules can be implemented in software, hardware or a combination of software and hardware. When implemented in software, the modules are stored on a non-transitory computer readable medium and executed by the processor 1102. The operating system 1114 may be configured to control the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component, so as to operate properly in connection with the operating system.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for synchronizing a clock at a customer premises equipment (CPE) location with a master clock at a central office (CO) location, comprising:
receiving, by a time-of-day transmission convergence (ToD-TC) module in the CO, ToD information relating to the master clock;
transporting the ToD information from the CO to the CPE;
based on the received ToD information, applying time stamps to reference data samples;
transporting the reference data samples with the applied time stamps from the CO to the CPE; and
utilizing the time stamps applied to the transported reference data samples and the transported ToD information to synchronize the CPE clock with the master clock.

2. The method of claim 1, wherein synchronizing comprises:
synchronizing a frequency of the CPE clock with respect to the master clock; and
synchronizing a phase of the CPE clock with respect to the master clock.

3. The method of claim 1, wherein transporting the ToD information is performed via an embedded operations channel (EOC) between the CO and CPE.

4. The method of claim 1, wherein the information received by the ToD-TC comprises:
a master clock edge, a master clock value associated with the master clock edge, and a master clock frequency, wherein the master clock edge is synchronous to the master clock frequency.

5. The method of claim 1, wherein the ToD information is synchronous to the master clock.

6. The method of claim 1, wherein the master clock in the CO is synchronous to a grandmaster clock.

7. The method of claim 1, wherein utilizing time stamps of the reference data samples to synchronize the CPE clock with the master clock comprises:
receiving, at the CPE, the reference data samples with time stamps and deriving timing based on the time stamps; and
based on the time stamps, synchronizing the CPE clock with the master clock with respect to frequency and phase.

8. The method of claim 7, wherein synchronizing with respect to frequency comprises synchronizing the frequency of the CPE clock using a loop timing block at the CPE based on the master clock frequency.

9. The method of claim 8, wherein using a loop timing block comprises using a phase lock loop (PLL) to synchronize the CPE clock with the master clock based on the reference samples with time stamps.

10. The method of claim 7, wherein synchronizing with respect to frequency comprises synchronizing based on phase difference values received from the CO over an embedded operations channel (EOC).

11. The method of claim 10, wherein the phase difference value comprises a compressed size of two bytes and is received from the CO approximately once every discrete multi-tone (DMT) super-frame.

12. The method of claim 10, wherein the phase difference value comprises fixed bytes in an overhead (OH) frame.

13. The method of claim 7, wherein synchronizing with respect to time and phase comprises determining an average offset based on time stamps generated by the CO and time stamps generated by the CPE, wherein the phase of the CPE clock is adjusted according to the average offset.

14. The method of claim 1, wherein applying time stamps to reference data samples is performed based on a first data sample or other reference sample established between the CO and the CPE following a synch symbol in a discrete multi-tone (DMT) sequence transmitted between the CO and CPE.

15. The method of claim 14, wherein applying time stamps to reference data samples is performed once every DMT super-frame.

16. A method for synchronizing a clock at a customer premises equipment (CPE) location with a master clock at a central office (CO) location, comprising:
    receiving, by a time-of-day transmission convergence (ToD-TC) module at the CO, time-of-day (ToD) information relating to the master clock;
    transporting the ToD information to the CPE;
    based on the received information, applying time stamps to reference data samples once every discrete multi-tone (DMT) super-frame;
    transporting the reference data samples with applied time stamps to the CPE; and
    utilizing, by a time-of-day transmission convergence (ToD-TC) module at the CPE, time stamps of the reference data samples and the transported ToD information to synchronize the CPE clock with the master clock with respect to frequency and phase.

17. The method of claim 16, wherein transporting the reference data samples with applied time stamps to the CPE comprises encoding ToD phase difference information in a frequency synchronization command.

18. The method of claim 17, wherein the frequency synchronization command comprises a downstream time stamp.

19. The method of claim 18, wherein the frequency synchronization command further comprises a one byte index identifying a specific superframe corresponding to a phase drift value being sent and two bytes specifying the phase drift value.

20. A system for synchronizing a clock at a customer premises equipment (CPE) location with a master clock at a central office (CO) location, comprising:
    a first time-of-day transmission convergence (ToD-TC) module at the CO configured to receive time-of-day (ToD) information relating to the master clock, the first ToD-TC module further configured to time stamp reference data samples and transmit the ToD information and the time stamped reference data samples to the CPE;
    a second ToD-TC module at the CPE configured to receive the ToD information and the time stamp reference data samples from the first ToD-TC module and synchronize the CPE clock with the master clock based on the received ToD information and the time stamped reference data samples.

21. The system of claim 20, wherein the first ToD-TC module performs time stamping of reference data samples using a time stamping clock synchronized to an external clock at the CO.

22. The system of claim 20, wherein the first ToD-TC module is configured to transmit a 2-byte drift value over an embedded operations channel EOC to the second ToD-TC module, wherein based on the 2-byte drift value, the second ToD-TC module synchronizes the CPE clock with the master clock with respect to phase.

23. The system of claim 20, wherein the second ToD-TC module monitors a time difference between successive reference data samples and adjusts a time difference between successive reference data samples sent to the CO such that the time differences is approximately zero.

\* \* \* \* \*